United States Patent [19]

Smith, Sr. et al.

[11] 4,232,631
[45] Nov. 11, 1980

[54] FEEDER DEVICE

[76] Inventors: Edward F. Smith, Sr., R.R. #2; Lloyd N. Treesh, P.O. Box 546, Avilla, both of Ind. 46710

[21] Appl. No.: 867,106

[22] Filed: Jan. 5, 1978

[51] Int. Cl.³ .............................................. A01K 5/02
[52] U.S. Cl. ................................... 119/52 AF; 119/53
[58] Field of Search ................. 119/52 AF, 53, 51.11; 222/56, 64, 39

[56] References Cited

U.S. PATENT DOCUMENTS

| | | | |
|---|---|---|---|
| 2,381,505 | 8/1945 | Lindholm | 222/56 |
| 3,230,933 | 1/1966 | Myers et al. | 119/53 |
| 3,301,218 | 1/1967 | Haggard et al. | 119/52 AF |
| 3,322,957 | 5/1967 | Scoggin | 222/56 X |

*Primary Examiner*—Hugh R. Chamblee
*Attorney, Agent, or Firm*—David A. Lundy

[57] ABSTRACT

An apparatus for distributing measured amounts of particulate material. A feed source is connected to a material conduit which leads to a receptacle. A monitoring assembly maintains the desired level of material in the receptacle. In a particular application, the apparatus distributes measured amounts of animal feed from a feed source into a feed trough accessible to feeding materials.

8 Claims, 3 Drawing Figures

FEEDER DEVICE

BACKGROUND OF THE INVENTION

The field of the invention relates to apparatus for distributing measured amounts of particulate material and in the specific embodiment disclosed pertains to an apparatus for distributing measured amounts of animal feed from a feed source into a feed trough accessible to feeding animals.

In the past, attempts have been made to provide devices which distribute measured amounts of animal feed. Many of these devices are elaborate, and thus, require substantial modification of existing facilities to install therein. Other devices base their measuring activities upon the weight of the feed or at least rely upon the flow characteristics or the weight of the feed and thus, the water content of the feed effects the measurement ability of these devices. The result being that more or less feed than is actually desired may be distributed depending upon the moisture content thereof.

Thus, it would be highly desirable to provide an improved apparatus for distributing animal feed that does not require substantial modification of existing facilities to install. It would also be highly desirable to provide an improved apparatus for distributing measured amounts of animal feed, the performance of which does not vary with the kind of feed used, or the weight, flow characteristics, or moisture content thereof.

SUMMARY OF THE INVENTION

It is an object of the invention to provide an improved apparatus for distributing measured amounts of particulate material.

It is another object of the invention to provide an improved apparatus for distributing measured amounts of animal feed that does not require substantial modification of existing facilities to install therein.

It is also an object of the invention to provide an apparatus for distributing measured amounts of animal feed that does not measure the feed by weight.

It is further an object of the invention to provide an improved apparatus for distributing measured amounts of animal feed, the performance of which does not vary with the kind of feed used, or the weight, flow characteristics, or moisture content thereof.

The invention is an apparatus for distributing measured amounts of particulate. A material source is connected to a conduit which leads to a receptacle. A monitoring assembly maintains the desired level of material in the receptacle. The monitoring assembly, in a specific embodiment, includes a pair of connected housings selectively positioned along the length of the conduit. An emitter is contained within one housing. A receiver is contained within the other housing. The emitter and receiver are in communication with each other. The conduit is between the housings and is of a signal-passing material. When a signal sent by the emitter is received by the receiver, material will continue to flow into the receptacle. However, when the material reaches a predetermined level in the conduit so as to interfer with the reception of the signal, the source will no longer supply material to the receptacle through the conduit, and consequently, the material will be stopped at a predetermined level.

BRIEF DESCRIPTION OF THE DRAWINGS

The above mentioned and other features and objects of this invention and the manner of attaining them will become more apparent and the invention itself will be best understood by reference to the following description of the invention taken in conjunction with the accompanying drawings wherein.

DETAILED DESCRIPTION OF A SPECIFIC EMBODIMENT

Figure 1:
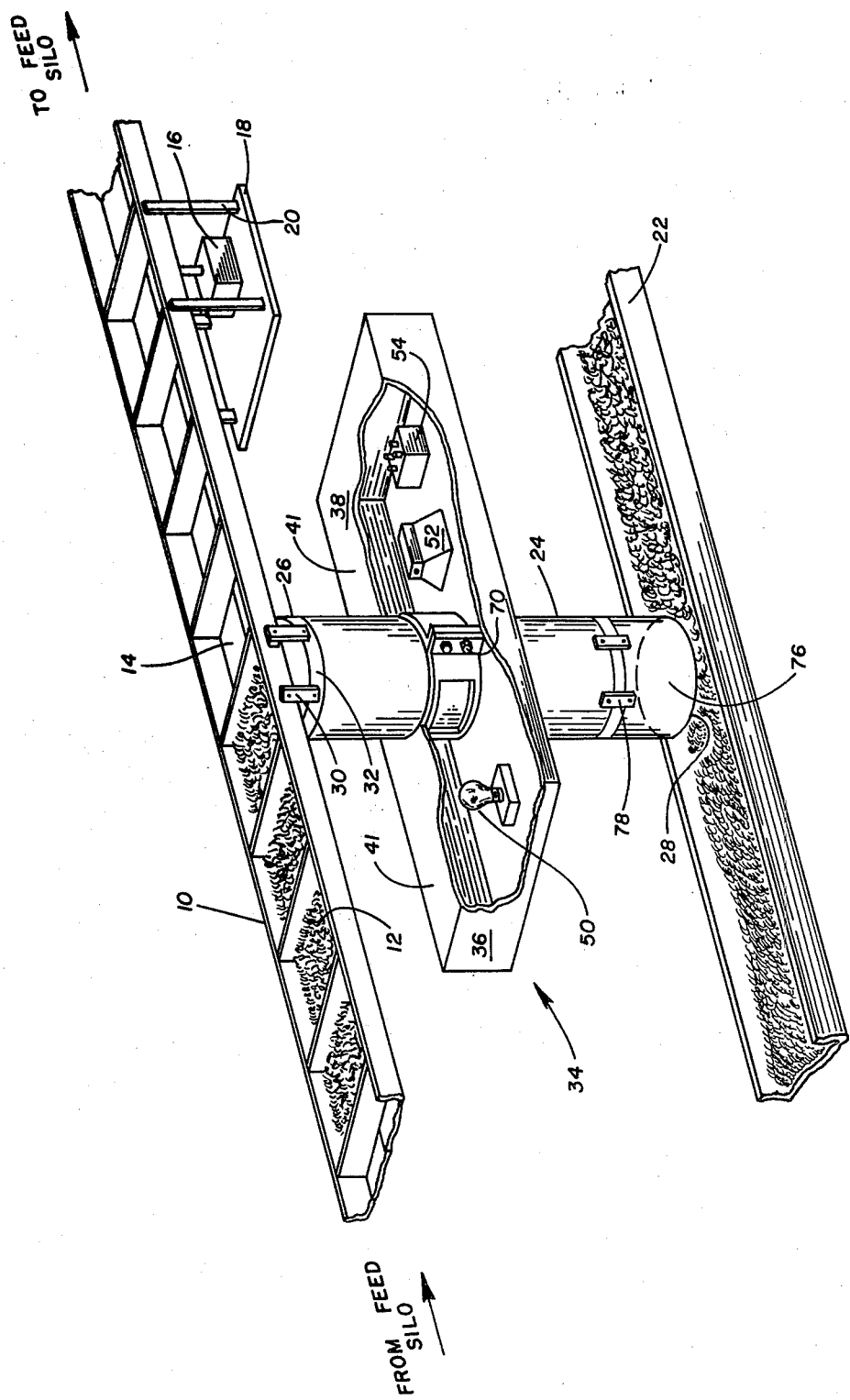
FIG. 1 is a perspective view of a specific embodiment of the invention having a portion of the monitoring assembly cut away.
Figure 2:
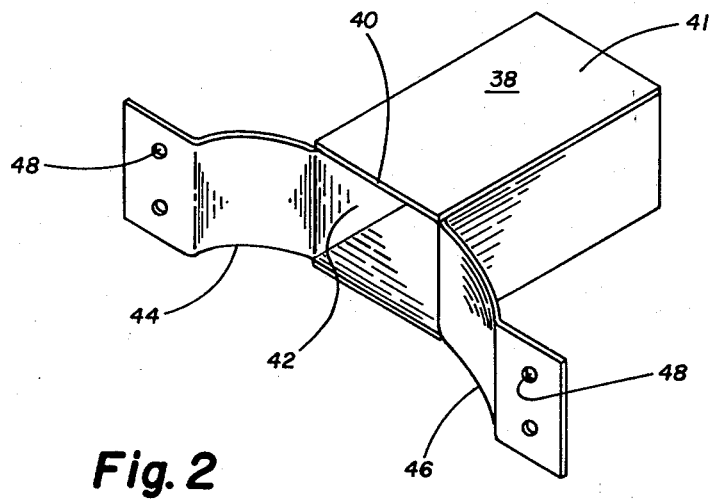
FIG. 2 is a perspective view of a single housing of the specific embodiment of the invention.
Figure 3:
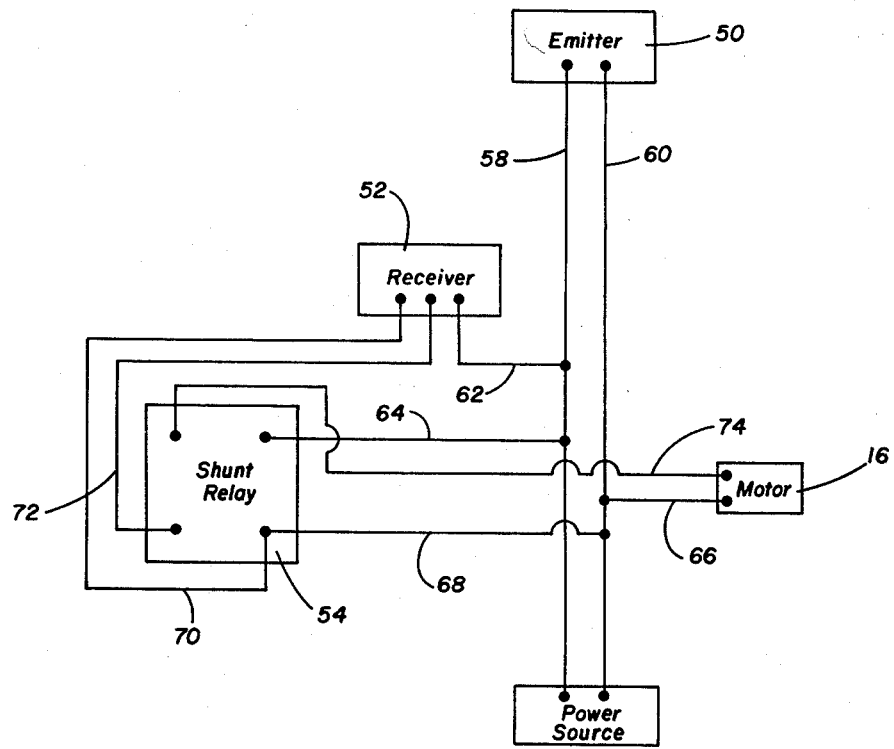
FIG. 3 is a diagrammatic view of the specific embodiment of the invention showing the circuitry of the invention.

Referring to the drawings, a conveyor 10 having a moving chain 12 and a bottom opening 14, is powered by a motor 16 secured to a platform 18 depending from the conveyor 10 by connectors 20. An elongated feed trough 22 is positioned below the conveyor 10.

An elongated feed conduit 24 has upper and lower ends 26 and 28 respectively. Feed conduit 24 is made of signal-passing material, as will become more apparent hereinafter. The upper end 26 of the feed conduit 24 is attached to the conveyor 10 beneath the opening 14 by a plurality of connectors 30 having their opposite ends attached to the conveyor and a band 32 surrounding the conduit 24 at the upper end 26 thereof. The feed conduit 24 depends from the conveyor 10 and is positioned over the feed trough 22. The feed conduit 24 is totally free of interior structure which in any way would impede the flow of feed through the conduit.

A monitoring assembly 34 includes a pair of housings 36, 38. Each of the housings 36, 38 are structurally similar so that a description of one will suffice for both. Each housing 36, 38 is of a generally rectangular shape and has an open end 40 and a removable top 41. The open end 40 is shaped to conform to the exterior shape of the conduit 24 and includes an opening 42. Opposite flanges 44, 46, also shaped to conform to the exterior shape of the conduit 24, extend outwardly from the sides of opening 42 and have apertures 48 in the distal ends thereof.

A signal emitter 50 is positioned within one housing 36. A signal receiver 52 and a shunt relay 54 are contained within the other housing 38. The signal emitter 50 and signal receiver 52 are positioned so as to be in operative alignment. In the specific embodiment illustrated, the signal emitter 50 is a light bulb, the signal receiver is a photo electric switch, and the signal-passing material of conduit 24 is translucent or transparent.

The signal emitter 50 is connected to power source 56 by conductors 58 and 60. A pair of conductors 62 and 64 branch off from conductor 58. The conductor 62 connected to the signal receiver 52, and the other conductor 64 is connected to the shunt relay 54. Another pair of conductors 66, 68 branch off from conductor 60. The conductor 66 is connected to the motor 16, and the other conductor 68 is connected to the shunt relay 54. The shunt relay 54 is connected to the signal receiver 52 by conductors 70 and 72. The shunt relay 54 is also connected to the motor 16 by conductor 74.

In operation, the operator will want to determine the amount of animal feed desirably distributed to the feed trough 22. Both the distance between end 28 of feed conduit 24 and feed trough 22 and the position of the monitoring assembly 34 will determine the amount of feed to be distributed. Once the amount of feed be distributed is determined, the operator may position the monitoring assembly 34 on the feed conduit 34. Once the monitoring assembly 34 is positioned at the desired height on the feed conduit 24 it can be detachably secured to feed conduit 24 by positioning connectors 70 in the apertures 48 of the corresponding flanges 44, 46 of the paired housings 36, 38 and tightened sufficiently. The vertical distance between end 28 of feed conduit 24 and feed trough 22 can be adjusted by using conduits 24 of different length or an extension 76 of a desired length. Extension 76 may be added or removed from the end 28 of the feed conduit 24 by removing or securing the connector 78 therebetween.

Once the monitoring assembly 34 is affixed to conduit 24, an operator activates the signal emitter 50, the signal receiver 52 and the shunt relay 54. When signals from the emitter 50 are received by the receiver 52, the motor 16 is activated, which, in turn, causes the conveyor 10 to move. As it moves, the conveyor 10 transports feed from a feed silo (not illustrated) to the feed conduit 24. Feed falls from the conveyor 10 through the conduit 24 and onto the feed trough 22. As long as the signal receiver 52 continues to receive signals from the signal emitter 50, the motor 16 will be energized and will continue to drive the conveyor 10. Consequently, feed will be continuously deposited in the feed conduit 24. The signal is not interferred with by the feed falling through the feed conduit 24. However, when the feed fills conduit 24 to a height such that feed is positioned between housings 36, 38, the signal receiver 52 no longer receives a signal from the signal emitter 50 and the motor 16 is deenergized. Consequently, when the feed blocks the signal from passing through the conduit 24 and the motor 16 no longer drives the conveyor 10, additional feed is no longer supplied from the feed source to the feed conduit 24.

By adjusting a position of the monitoring assembly 34 of the feed conduit 24 and the distance between the lower end 28 of the conduit 24 or an extension 76 thereof and the feed conveyor 10, the volume of feed dispensed into the feed trough 22 is controlled. Surprisingly, the particular type of feed, the weight of the feed, its moisture content, and its flow characteristics do not vary the volume of the feed dispensed once the monitoring assembly 34 is secured to the conduit 24 and the distance between the conduit 24 and the feed trough 22 is chosen.

The top end 41 of either housing 36, 38 may be removed for servicing.

Thus, it can be seen that the invention provides a device for delivering measured amounts of animal feed. The ability of the monitoring assembly 34 to be easily attached to and removed from the feed conduit 24 is a highly desirable characteristic because the installation of the device does not require elaborate modifications of the existing facilities. Further, the amount of grain is measured by the volume of grain which eventually stacks up in the feed conduit 24. This is opposed to other measuring methods, such as by the weight of the feed, which are subject to deviation due to the variaces in the types and properties of the feed.

While there have been described above the principles of this invention in connection with specific apparatus, it is to be clearly understood that this description is made only by way of example and not as a limitation to the scope of the invention.

What is claimed is:

1. An apparatus for distributing measured amounts of particulate material comprising a conveyor, said conveyor having a material-moving mechanism and a discharge outlet, a material receptacle positioned below said conveyor discharge outlet, said material receptacle having a bottom, a conduit being mounted between said conveyor outlet and said receptacle bottom, said conduit having opposite open ends, one of said conduit ends being in communication with said conveyor outlet, the other of said conduit ends being in communication with said receptacle, said conveyor having means for driving said mechanism with an on condition in which said particulate material is caused to flow into said one conduit end and through said conduit and into said receptable, said other conduit end being spaced from said receptacle bottom a distance by which said particulate material flow first fills said receptacle to a desired level and then fills said conduit, a material monitor including a signal sender and a signal receiver, said signal sender and signal receiver being selectively mounted on opposite sides of said conduit at a predetermined height, said signal sender directing a signal toward said signal receiver and through said conduit and said particulate material flow when said driving means is in said on condition, said conduit being of a material which allows said signal to pass through said conduit, said signal being uninterrupted by said particulate material flowing through said conduit, whereby said signal sender and signal receiver are in signal communication, said signal being blocked when said conduit is filled with said particulate material above said predetermined height, said driving means having an off condition in which no particulate material is caused to flow into said one conduit end, said signal receiver being operatively connected to said driving means, said driving means being in said on condition when said signal sender and signal receiver are in signal communication, said driving means being in said off condition when said signal is blocked.

2. The apparatus of claim 1 wherein said monitor means further includes a pair of housings, each of said housings having an open end, said housings being connected at said open ends and surrounding said conduit.

3. The apparatus of claim 2 wherein said signal sender is positioned within one of said housings, and said signal receiver is positioned within the other of said housings.

4. The apparatus of claim 2 wherein said open ends of said housings are aligned upon the same longitudinal axis, said axis intersecting the longitudinal axis of said conduit.

5. The apparatus of claim 1, wherein said monitor means includes means for selectively positioning said monitor on said conduit.

6. The apparatus of claim 1 wherein said signal sender includes a light source, said signal receiver includes a photoelectric cell, and said conduit is of a material which transmits light therethrough.

7. An apparatus for distributing measured amounts of animal feed comprising a conveyor, said conveyor having a material-moving mechanism and a discharge outlet, a feed receptacle positioned below said conveyor discharge outlet, said feed receptacle having a bottom, a feed conduit being mounted between said conveyor outlet and said feed receptacle bottom, said feed conduit having opposite open ends, one of said feed conduit ends being in communication with said conveyor outlet, the other of said feed conduit ends being in communication with said feed receptacle, said conveyor having means for driving said mechanism with an on condition in which said feed is caused to flow into said one feed conduit end and through said feed conduit and into said feed receptacle, said other feed conduit end being spaced from said feed receptacle bottom a distance by which said feed flow first fills said feed receptacle to a desired level and then fills said feed conduit, a feed monitor including a signal sender and a signal receiver, said signal sender and said signal receiver being selectively mounted on opposite sides of said feed conduit at a predetermined height, said signal sender directing a signal toward said signal receiver and through said feed conduit and said feed flow when said driving means is in said on condition, said conduit being of a material which allows said signal to pass through said conduit, said signal being uninterrupted by said feed flowing through said feed conduit, whereby said signal sender and said signal receiver are in signal communication, said signal being blocked when said feed conduit is filled with said feed above said predetermined height, said driving means having an off condition in which no feed is caused to flow into said one feed conduit end, said signal receiver being operatively connected to said driving means, said driving means being in said on condition when said signal sender and signal receiver are in signal communication, said driving means being in said off condition when said signal is blocked.

8. An apparatus comprising a conveyor, said conveyor having a material-moving mechanism and a discharge outlet, a conduit having opposite ends, one of said conduit ends being in communication with said discharge outlet, said conveyor having means for driving said mechanism with an on condition in which said particulate material is caused to flow into said one conduit end, thereby filling said conduit, a material monitor including a signal sender and a signal receiver, said signal sender and signal receiver being selectively mounted on opposite sides of said conduit at a predetermined height, said signal sender directing a signal toward said signal receiver and through said conduit and said particulate material flow when said driving means is in said on condition, said conduit being of a material which allows said signal to pass through said conduit, said signal being uninterrupted by said particulate material flowing through said conduit, whereby said signal sender and signal receiver are in signal communication, said signal being blocked when said conduit is filled with said particulate material above said predetermined height, said driving means having an off condition in which no particulate material is caused to flow into said one conduit end, said signal receiver being operatively connected to said driving means, said driving means being in said on condition when said signal sender and signal receiver are in signal communication, said driving means being in said off condition when said signal is blocked.

* * * * *